O. M. POND.
Grain Drill.
No. 40,359. Patented Oct. 20, 1863.
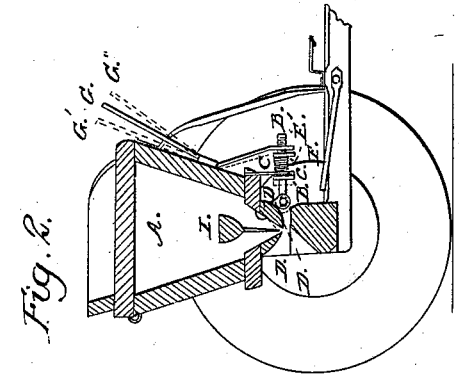
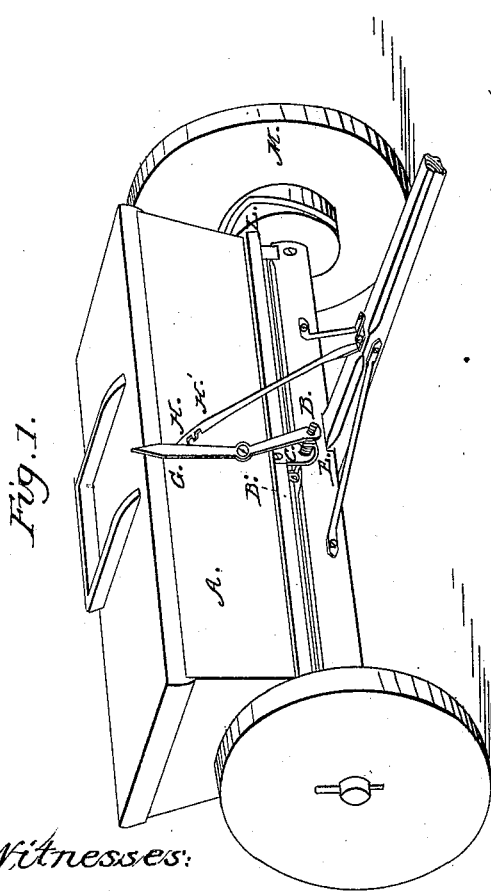
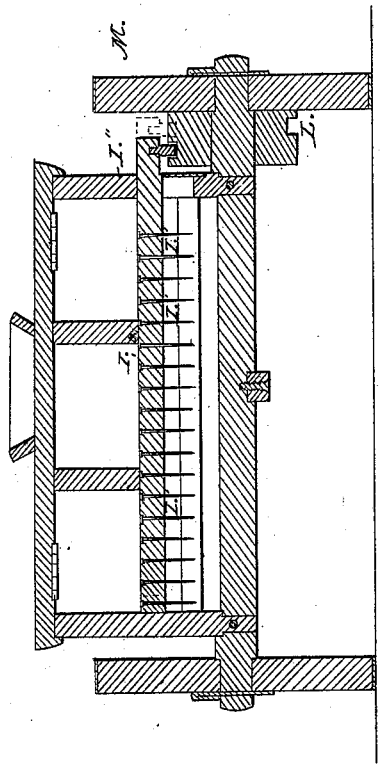
Witnesses:
Inventor:
O. M. Pond.

UNITED STATES PATENT OFFICE.

O. M. POND, OF INDEPENDENCE, IOWA.

IMPROVEMENT IN GRAIN-DRILLS.

Specification forming part of Letters Patent No. 40,359, dated October 20, 1863.

*To all whom it may concern:*

Be it known that I, O. M. POND, of Independence, in the county of Buchanan and State of Iowa, have invented new and useful Improvements in Seeding-Machines; and I do hereby declare that the following is a full and complete description of the construction and operation of the same, reference being had to the accompanying drawings, making part of this specification, in which—

Figure 1 is a perspective view. Fig. 2 is a transverse vertical section, and Fig. 3 is a longitudinal vertical section.

Like letters refer to like parts in the several views.

The seed-box is shown at A. This may be six or eight feet in length, is placed above the axle-tree B, and rests upon supports at each end. The bottom of the box is provided with a hinged lip, D, which runs the whole length of the seed-box for the purpose of opening the same for the distribution of the seed. This lip forms contact with a stationary lip, D', and when brought into contact completely closes the bottom of the seed-box A. The lip D is operated by means of a screw-bolt, B, which is attached to the under side of the lip by an articulating joint, B'. This bolt passes through a guide, C, behind which is placed a nut, C', which regulates the distance through which the lip can move.

Upon the outside of the guide C is a spiral spring, E, one end of which rests against the guide, the other end resting against the nut F. The strength of this spring is sufficient to keep the lip D a sufficient distance from the lip D' to admit the passage of the grain, and the width of the opening is regulated by means of the nut C, which can be adjusted to suit the quantity of grain to be sown per acre. The nut F can also be adjusted to give the required tension to the spring E.

G represents a lever, pivoted to the front of the seed-box A, the short arm of which embraces the screw B. The long arm of this lever extends upward near to the driver's seat, and when thrown back to G' the spring E opens the passage for the grain between the lips D and D' to the extent allowed by the nut C'. If the lever is moved forward to G" and secured in the notch H or H', the opening is completely closed, and no grain can pass through. This is done in moving forward to the field and over places where it is not desirable to distribute the seed.

For the purpose of keeping the grain from clogging in the grain-box I introduce a vibrating rake, I. This consists of a rod, I, provided with teeth or fingers I', which reach downward to the opening between the lips D D'. The rod I is supported by the partitions J in the seed-box. One end of the rod, as shown at I", passes through the end of the seed-box, and is provided with a stud, K, which works in a cam, L, upon the hub of the wheel M. As the wheel rotates the cam L puts the vibrating rake in motion in the direction of the seed-opening between the lips D and D', and by its motion the passage is kept clear of all obstructions, and the seed is distributed with great uniformity.

What I claim as my improvement, and desire to secure by Letters Patent, is—

1. The stationary lip D' and hinged lip D, in combination with the vibrating rake I, arranged and operating as and for the purpose specified.

2. The adjusting-nut C', bolt B, spring E, and nut F, in combination with the lever G, arranged as and for the purpose described.

O. M. POND.

Witnesses:
 THOS. SCARCLIFF,
 D. D. HOLRIDGE.